United States Patent
Lee et al.

(10) Patent No.: US 8,487,599 B2
(45) Date of Patent: Jul. 16, 2013

(54) DE-GLITCH SWITCHING CONVERTING CIRCUIT AND CONTROLLER THEREOF

(75) Inventors: Li-Min Lee, Taipei County (TW); Chung-Che Yu, Taipei County (TW); Shian-Sung Shiu, Taipei County (TW); Ji-Ming Chen, Wuxi (CN)

(73) Assignee: Green Solution Technology Co., Ltd, New Taipei (TW)

(*) Notice: Subject to any disclaimer, the term of this patent is extended or adjusted under 35 U.S.C. 154(b) by 344 days.

(21) Appl. No.: 12/906,137

(22) Filed: Oct. 18, 2010

(65) Prior Publication Data

US 2011/0215780 A1    Sep. 8, 2011

(30) Foreign Application Priority Data

Mar. 2, 2010    (CN) .......................... 2010 1 0117549

(51) Int. Cl.
*G05F 1/40* (2006.01)
(52) U.S. Cl.
USPC ......................................... 323/282; 327/536
(58) Field of Classification Search
USPC .... 323/222, 266, 267, 268, 282–290; 363/16, 363/17, 21.08, 21.12, 21.14, 21.15, 21.18; 327/264, 262, 393, 395, 113
See application file for complete search history.

(56) References Cited

U.S. PATENT DOCUMENTS

| | | | | |
|---|---|---|---|---|
| 4,868,729 A * | 9/1989 | Suzuki | ......................... | 363/21.15 |
| 5,760,612 A | 6/1998 | Ramirez | | |
| 5,793,623 A * | 8/1998 | Kawashima et al. | ...... | 363/56.05 |
| 5,990,753 A * | 11/1999 | Danstrom et al. | ............ | 331/143 |
| 6,147,526 A * | 11/2000 | Skelton et al. | ................ | 327/134 |
| 6,466,078 B1 * | 10/2002 | Stiff | ............... | 327/536 |
| 6,778,111 B1 * | 8/2004 | Zhu et al. | ...................... | 341/134 |
| 7,023,253 B2 * | 4/2006 | Huang et al. | .................. | 327/172 |
| 7,035,071 B1 * | 4/2006 | Tiew et al. | ................... | 361/93.9 |
| 7,119,499 B2 * | 10/2006 | Ishigaki et al. | ............... | 315/291 |
| 7,187,213 B2 * | 3/2007 | Yoshida et al. | ................ | 327/34 |
| 2009/0302820 A1 * | 12/2009 | Shimizu et al. | .............. | 323/285 |

FOREIGN PATENT DOCUMENTS

| | | |
|---|---|---|
| CN | 101272095 | 9/2008 |
| TW | 200505138 | 2/2005 |

OTHER PUBLICATIONS

"First Office Action of China Counterpart Application", issued on Dec. 12, 2012, p. 1-p. 7.
"Office Action of Taiwan Counterpart Application", issued on Jan. 7, 2013, p. 1-p. 4.

* cited by examiner

*Primary Examiner* — Rajnikant Patel
(74) *Attorney, Agent, or Firm* — Jianq Chyun IP Office

(57) ABSTRACT

A de-glitch switching converting circuit and a controller thereof are provided. In the embodiment of the invention, the circuit can filter noises with high frequency by way of time judgment, so as to avoid the erroneous operation of the controller affecting the stability of the output voltage or the output current. Compared with the method of using low-pass filters with large capacitors to filter noises, highly increasing the cost of the circuit is unnecessary in the embodiment of the invention. The circuit in the embodiment of the invention also has the capability for filtering noises with high amplitudes. In addition, by setting suitable parameters, the circuit in the embodiment of the invention can also avoid affecting the transient response of the circuit while filtering noises.

16 Claims, 8 Drawing Sheets

DE-GLITCH SWITCHING CONVERTING CIRCUIT AND CONTROLLER THEREOF

CROSS-REFERENCE TO RELATED APPLICATION

This application claims the priority benefit of China application serial no. 201010117549.0, filed on Mar. 2, 2010. The entirety of the above-mentioned patent application is hereby incorporated by reference herein and made a part of this specification.

BACKGROUND OF THE INVENTION

1. Field of the Invention

The invention relates to a switching converting circuit and a controller thereof. More particularly, the invention relates to a de-glitch switching converting circuit and a controller thereof.

2. Description of Related Art

For power supplies, switching converting circuits are mainstream products in the current market due to superior properties of high converting efficiency, small size, and low power consumption while no load. However, switching converting circuits have the disadvantages of complex circuit design, large ripples, and large electromagnetic interference (EMI). In the current market, common switching converting circuits mainly have two types of control methods. One is pulse width modulated (PWM), and the other is pulse frequency modulated (PFM). Due to constant frequency in PWM technology, EMI is more easily filtered, and the capability of de-glitch is stronger. However, the disadvantages of switching converting circuits with PWM technology are low converting efficiency and slow transient response while light load. On the contrary, PFM technology has advantages of high converting efficiency and fast transient response. However, EMI is not easily filtered, and the capability of de-glitch is weak in switching converting circuits with PFM technology.

FIG. 1 is a schematic circuit diagram of a conventional DC-to-DC buck converting circuit with PFM technology.

Referring to FIG. 1, the DC-to-DC buck converting circuit includes a switch SW, a synchronous diode D, an inductor L, an output capacitor C, a voltage detecting circuit which composed of resistors R1 and R2, and a controller 10. The voltage detecting circuit detects an output voltage VOUT of the DC-to-DC buck converting circuit and thereby generates a voltage feedback signal VFB. The controller 10 includes a comparator 12, a constant pulse width controller 22, and a driver 32. The comparator 12 receives the voltage feedback signal VFB and a reference signal Vref and triggers the constant pulse width controller 22 to generate a constant pulse width signal with constant width to the driver 32 while the level of the voltage feedback signal VFB is lower than that of the reference signal Vref. The driver 32 generates a control signal Sc to switch the switch SW according to the pulse width signal of the constant pulse width controller 22 and thereby controls an amount of the power which is transmitted from an input voltage VIN to the output end, such that the output voltage VOUT is stabilized about a specific voltage level.

FIG. 2 is a timing diagram of signals of the DC-to-DC buck converting circuit shown in FIG. 1. Referring to FIG. 2, when the level of the voltage feedback signal VFB is reduced to that of the reference signal Vref, the controller 10 generates the control signal Sc with constant pulse width to conduct the switch SW to transmit the power to the output end, such that the output voltage VOUT is increased. The voltage feedback signal VFB has some ripples due to noise interference, such that the controller may erroneously operate and affect the stability of the output voltage VOUT. As shown in FIG. 2, the part of the output voltage VOUT circled by the dotted circle Q is interfered by noises, such that the controller erroneously operates and untimely outputs the control signal Sc, and thereby the maximum of the output voltage VOUT circled by the dotted circle S is obviously higher than that of the output voltage VOUT in other periods.

In order to reduce noise interference, Richtek Technology Corp. discloses an apparatus and a method for noise sensitivity improvement to a switching system in U.S. Pat. No. 7,023,253. FIG. 3 is a schematic circuit diagram of the switching system disclosed in the foregoing patent. Referring to FIG. 3, the controller 10' includes two amplifiers 14 and 15, a low-pass filter (LPF) 16, a summing circuit 18, a comparator 24, and a constant on-time circuit 31. The amplifier 14 amplifies the feedback signal VFB by a gain K to generate an amplified signal FBF, while the amplifier 15 amplifies the feedback signal VFB by a gain N to generate a signal filtered by the LPF 16 to generate an amplified and filtered signal FBS. The summing circuit 18 combines the signals FBF and FBS to generate an output signal FBX. The comparator 24 compares the output signal FBX and the reference signal Vref and triggers the constant on-time circuit 31 to generate control signals S1 and S2 to respectively control a first switch SW1 and a second switch SW2 while the level of output signal FBX is lower than that of the reference signal Vref. FIG. 4 is a timing diagram of signals of the switching system shown in FIG. 3. Referring to FIG. 4, the level of the amplified signal FBF is increased, such that the level which is located at the wave trough and easily has noises is relatively farther from the wave trough to achieve the objective of reducing noises.

However, in order to filter noises, the LPF 16 provided in the foregoing patent requires a larger capacitor to achieve the objective of filtering. Hence, it is necessary to increase the area of the die to dispose the capacitor for filtering or increase the pins of the chip to externally connect the capacitor for filtering, such that the cost is increased. In addition, for noises with high amplitudes, the circuit may also erroneously operate such that the stability of the output voltage is still affected.

SUMMARY OF THE INVENTION

In the related art, by using low-pass filters for reduce noise interference, the cost of the circuit is increased, and the issue of noises with high amplitudes can not be overcome. Accordingly, the embodiment of the invention can avoid the cost of the circuit increasing and filter noises with high amplitudes by way of time judgment. In addition, by setting suitable filtering parameters, the transient response of the circuit may be not affected.

An embodiment of the invention provides a controller of a de-glitch switching converting circuit including a noise filtering unit, an on-time unit, and a driving unit. The noise filtering unit determines whether to output a pulse signal according to a predetermined time length and a condition of which an output voltage of the de-glitch switching converting circuit is lower than a predetermined output voltage. The on-time unit outputs a constant pulse width signal according to the pulse signal. The driving unit controls the de-glitch switching converting circuit according to the constant pulse width signal such that the output voltage is stabilized at the predetermined output voltage.

Another embodiment of the invention provides a de-glitch switching converting circuit including a converting circuit and a controller. The converting circuit transmits an electrical power of a DC input power source to an output end according to at least one control signal, so as to provide a DC output voltage to drive a load. The controller determines whether to output the at least one control signal according to a predetermined time length and a condition of which the DC output voltage of the de-glitch switching converting circuit is lower than a predetermined output voltage, wherein a pulse width of the at least one control signal is constant.

Another embodiment of the invention provides a controller of a de-glitch switching converting circuit including a noise filtering unit, an on-time unit, and a driving unit. The noise filtering unit determines whether to output a pulse signal according to a predetermined time length and a condition of which a load current flowing through a load provided by the de-glitch switching converting circuit is lower than a predetermined output current. The on-time unit outputs a constant pulse width signal according to the pulse signal. The driving unit controls the de-glitch switching converting circuit according to the constant pulse width signal such that the load current is stabilized at the predetermined output current.

Another embodiment of the invention provides a de-glitch switching converting circuit including a converting circuit and a controller. The converting circuit transmits an electrical power of a DC input power source to an output end according to at least one control signal, so as to provide a DC output voltage to drive a load. The controller determines whether to output a pulse signal according to a predetermined time length and a condition of which a load current flowing through a load provided by the de-glitch switching converting circuit is lower than a predetermined output current, wherein a pulse width of the at least one control signal is constant.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
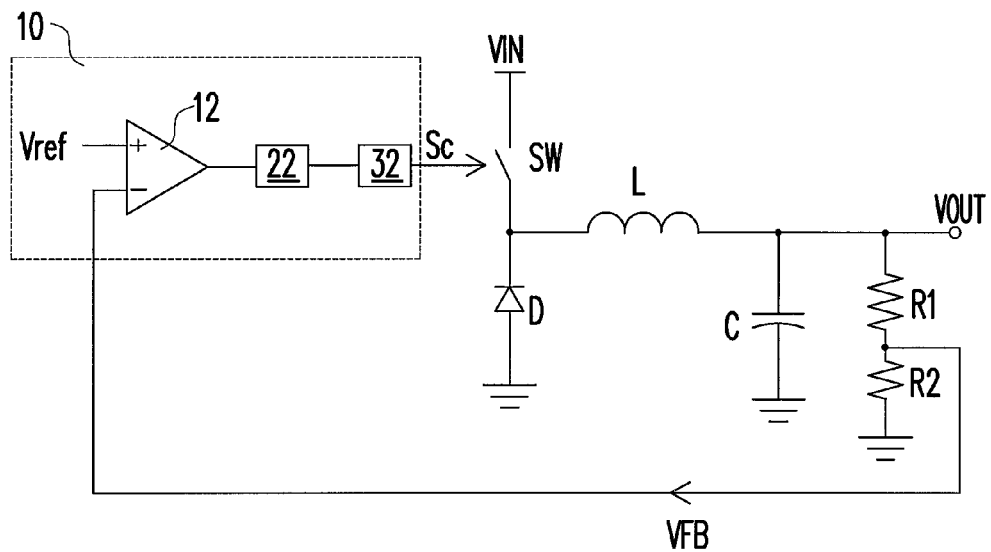
FIG. 1 is a schematic circuit diagram of a conventional DC-to-DC buck converting circuit with PFM technology.
Figure 2:
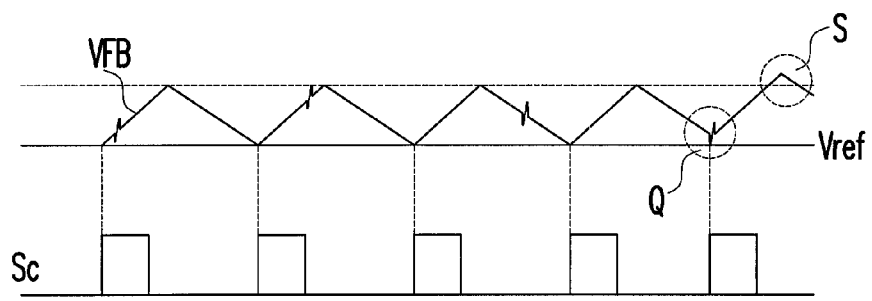
FIG. 2 is a timing diagram of signals of the DC-to-DC buck converting circuit shown in FIG. 1.
Figure 3:
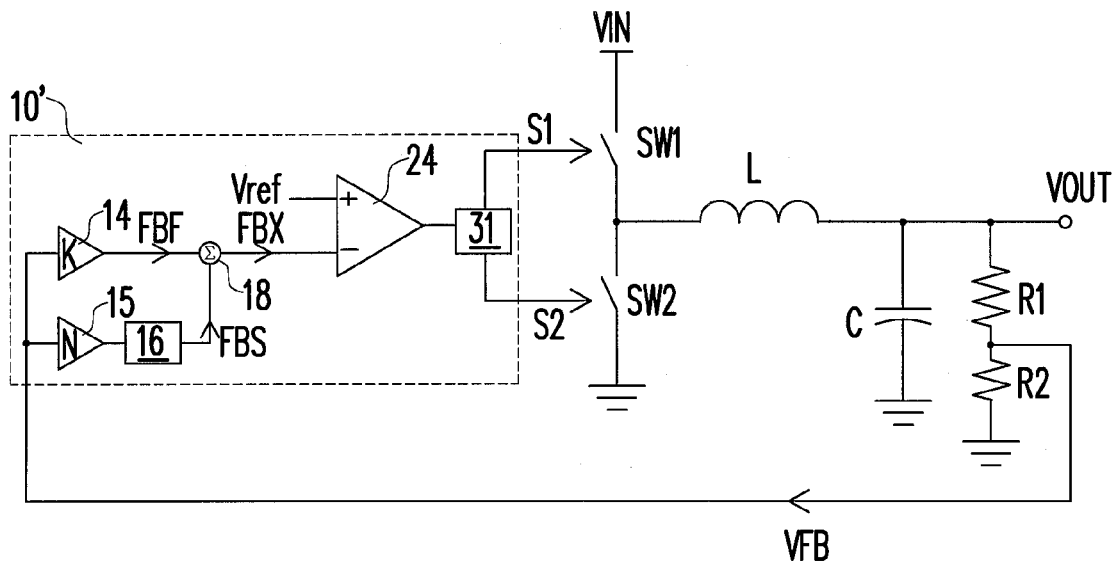
FIG. 3 is a schematic circuit diagram of the switching system disclosed in the related art.
Figure 4:
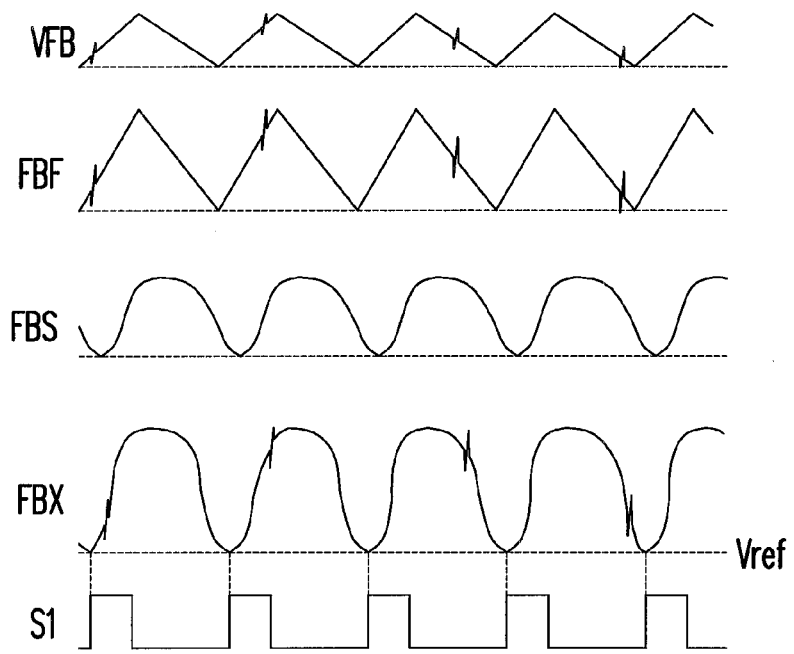
FIG. 4 is a timing diagram of signals of the switching system shown in FIG. 3.
Figure 5:
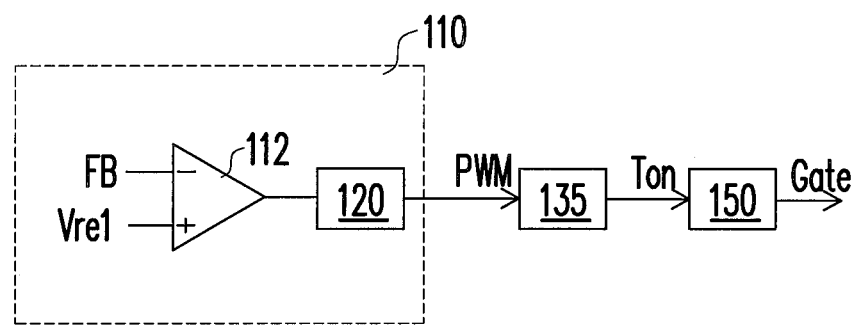
FIG. 5 is a schematic circuit diagram of a controller of a switching converting circuit according to a first embodiment of the invention.

FIG. 5 is a schematic circuit diagram of a controller of a switching converting circuit according to a first embodiment of the invention. Referring to FIG. 5, the controller of the switching converting circuit includes a noise filtering unit 110, an on-time unit 135, and a driving unit 150. The noise filtering unit 110 includes a comparing unit 112 and a delay unit 120. The comparing unit 112 receives a feedback signal FB representing a state of a load of the switching converting circuit, e.g. a voltage drop of the load, a current flowing through the load, and the like, and a reference signal Vre1. The comparing unit 112 generates a comparing signal to the delay unit 120 when the feedback signal FB is lower than the reference signal Vre1. The delay unit 120 receives the comparing signal and determines whether the comparing signal continuously exists for a predetermined time length or determines whether an accumulating time for which the comparing signal exists is longer than the predetermined time length during each period. If so, the delay unit 120 outputs a pulse signal PWM. The on-time unit 135 generates a constant pulse width signal Ton after receiving the pulse signal PWM. The driving unit 150 generates at least one control signal Gate according to the constant pulse width signal Ton to control the switching converting circuit.

Accordingly, when the level of the feedback signal FB is rapidly and temporarily lower than that of the reference signal Vre1 due to noises, the comparing unit 112 temporarily outputs the comparing signal to the delay unit 120. However, the output time thereof is shorter than the predetermined time length, such that the delay unit 120 does not output the pulse signal PWM. Hence, it may ensure that noises do not affect the operation stability of the switching converting circuit. When the output voltage of the switching converting circuit is lower than the predetermined output voltage, it causes that the feedback signal FB is continuously lower than the reference signal Vre1. At this time, the delay unit 120 outputs the pulse signal PWM such that the on-time unit 135 generates a constant pulse width signal Ton. The driving unit 150 generates at least one control signal Gate according to the constant pulse width signal Ton, such that the switching converting circuit transmits electrical power to the output end to boost the level of the feedback signal FB. In addition, by setting a suitable predetermined time length, the effect of the noise is reduced, and the switching converting circuit has a better transient response.

Figure 6:
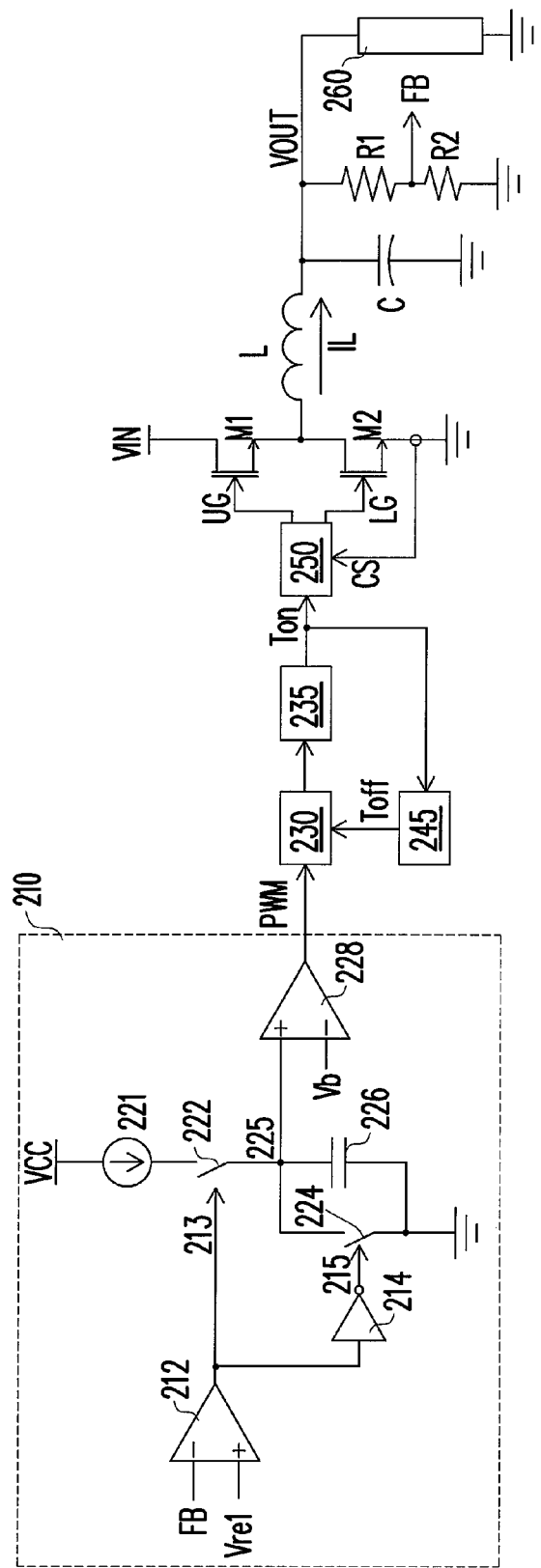
FIG. 6 is a schematic circuit diagram of a controller of a DC-to-DC buck converting circuit according to a second embodiment of the invention.

FIG. 6 is a schematic circuit diagram of a controller of a DC-to-DC buck converting circuit according to a second embodiment of the invention. Referring to FIG. 6, the DC-to-DC buck converting circuit includes a noise filtering unit 210, a rising edge triggering unit 230, an on-time unit 235, a minimum off-time unit 245, a driving unit 250, a first switch M1, a second switch M2, an inductor L, an output capacitor C, and a voltage detecting circuit composed of resistors R1 and R2 to drive a load 260. The voltage detecting circuit detects an output voltage VOUT generated by the DC-to-DC buck converting circuit to generates a feedback signal FB representing the size of the output voltage VOUT.

The noise filtering unit 210 includes a comparing unit 212, an inverter 214, a current source 221, a first switch 222, a second switch 224, a capacitor 226, and a comparator 228. The first switch 222 and the second switch 224 respectively control the charge and the discharge of the capacitor 226.

Alternately conducting the first switch 222 and the second switch 224 is better. The comparing unit 212 receives the feedback signal FB and a reference signal Vre1 and generates a comparing signal 213 with a high level to conduct the first switch 222 when the feedback signal FB is lower than the reference signal Vre1. The first switch 222 is coupled to the current source 221 and the capacitor 226 and charges the capacitor 226 by the current of the current source 221 when being conducted. At this time, the inverter 214 inverts the comparing signal 213 to output a signal with a low level to cut off the second switch 224. Accordingly, a voltage drop 225 of the capacitor 226 gradually increases. When the feedback signal FB is higher than the reference signal Vre1, the comparing unit 212 generates the comparing signal 213 with the low level to cut off the first switch 222 to stop charging the capacitor 226. At this time, the inverter 214 inverts the comparing signal 213 to output a signal with the high level to conduct the second switch 224 such that the capacitor 226 discharges. Accordingly, the voltage drop 225 decreases to zero. The comparator 228 compares the voltage drop 225 and a reference voltage Vb and outputs a pulse signal PWM when the voltage drop 225 is higher than the reference voltage Vb.

The rising edge triggering unit 230 is coupled to the noise filtering unit 210 and generates a rising edge detecting signal to trigger the on-time unit 235 to generate a constant pulse width signal Ton when detecting the rising edge of the pulse signal PWM. The driving unit 250 generates a first control signal UG to control the switch of the first switch M1 according to the constant pulse width signal Ton and generates a second control signal LG to control the switch of the second switch M2 according to a current detecting signal CS which represents the size of the current flowing through the second switch M2 and the first control signal UG, such that the current IL of the inductor L can flow through the second switch M2 when the first switch M1 is cut off. The constant pulse width signal Ton is also transmitted to the minimum off-time unit 245. The minimum off-time unit 245 generates a minimum off-time signal Toff having a constant pulse width to the rising edge triggering unit 230 when detecting the falling edge of the constant pulse width signal Ton. During the period in which the rising edge triggering unit 230 receives the minimum off-time signal Toff, the rising edge triggering unit 230 stops detecting the rising edge of the pulse signal PWM to ensure that the energy stored in the inductor L can be released.

Figure 7:
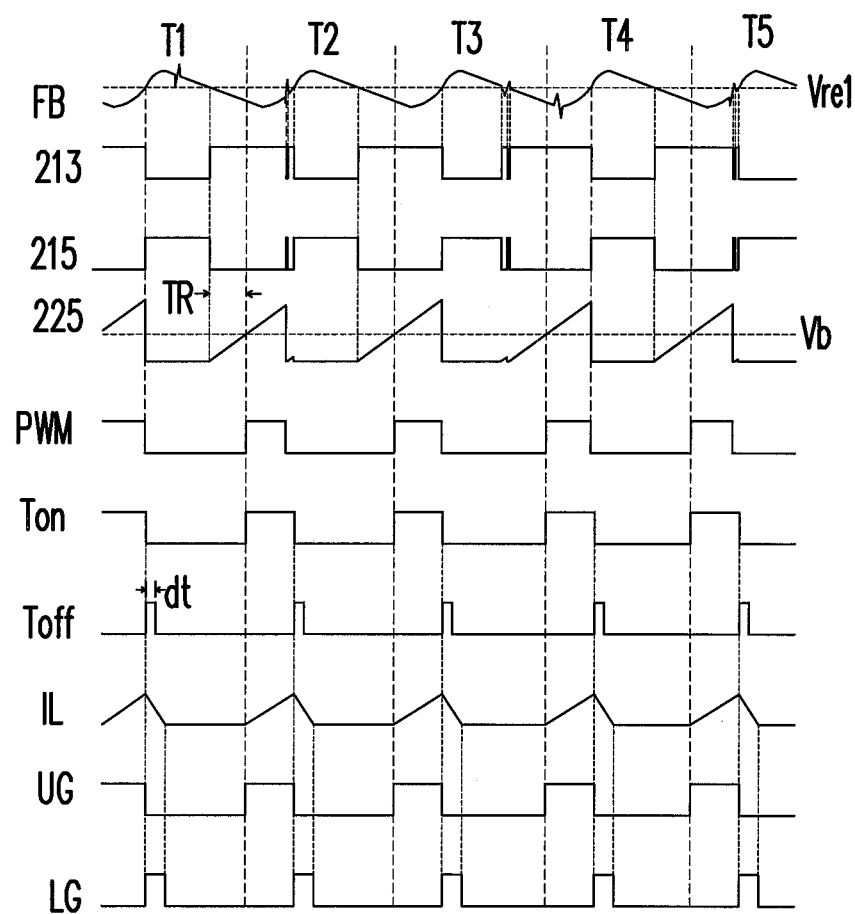
FIG. 7 is a timing diagram of signals of the DC-to-DC buck converting circuit shown in FIG. 6.

FIG. 7 is a timing diagram of signals of the DC-to-DC buck converting circuit shown in FIG. 6. Referring to FIG. 6 and FIG. 7, when the level of the feedback signal FB is lower than that of the reference signal Vre1, the comparing signal 213 changes to have the high level, and the inverting signal 215 changes to the low level, such that the first switch 222 is conducted, and the second switch 224 is cut off. At this time, the current source 221 starts to charge the capacitor 226, such that the voltage drop 225 gradually increases from zero. When the voltage drop 225 increases higher than the reference voltage Vb, the comparator 228 outputs the pulse signal PWM with the high level, such that the rising edge triggering unit 230 triggers the on-time unit 235 to generate the constant pulse width signal Ton with a constant time length. At this time, the driving unit 250 generates the first control signal UG to conduct the first switch M1 according to the constant pulse width signal Ton, such that the input voltage starts to transmit electrical power to the DC-to-DC buck converting circuit. Accordingly, the current IL starts to increase. When the constant pulse width signal Ton changes to have the low level after the constant time length, the minimum off-time unit 245 generates the minimum off-time signal Toff with a constant pulse width, e.g. a time length dt. At this time, the driving unit 250 outputs the first control signal UG with the low level so as to cut off the first switch M1 and outputs the second control signal LG with the high level so as to conduct the second switch M2. Accordingly, the current IL flows through the second switch M2. When the current IL gradually decreases to zero, the driving unit 250 outputs the second control signal LG with the low level so as to cut off the second switch M2. At this time, the first control signal UG still has the low level. As shown in FIG. 7, during the first period T1 and the fourth period T4, noises do not affect the determination of the comparing unit 212. However, during the second period T2, the third period T3, and the fifth period T5, the level of the feedback signal FB is close to that of the reference signal Vre1, such that the comparing unit 212 may erroneously operate. In addition, the time of which noises affect the comparing unit 212 is short such that the voltage drop 255 does not increase higher than the reference voltage Vb. Accordingly, the determination of the noise filtering unit 210 is not affected. Herein, the time parameter for the voltage drop 225 to be charged to the reference voltage Vb is TR=Cf*Vb/I1, wherein Cf is the capacitance of the capacitor 226, and I1 is the current value of the current source 221. Setting a suitable time parameter TR may adjust the capabilities of filtering noises and transient response of the circuit.

Figure 8:
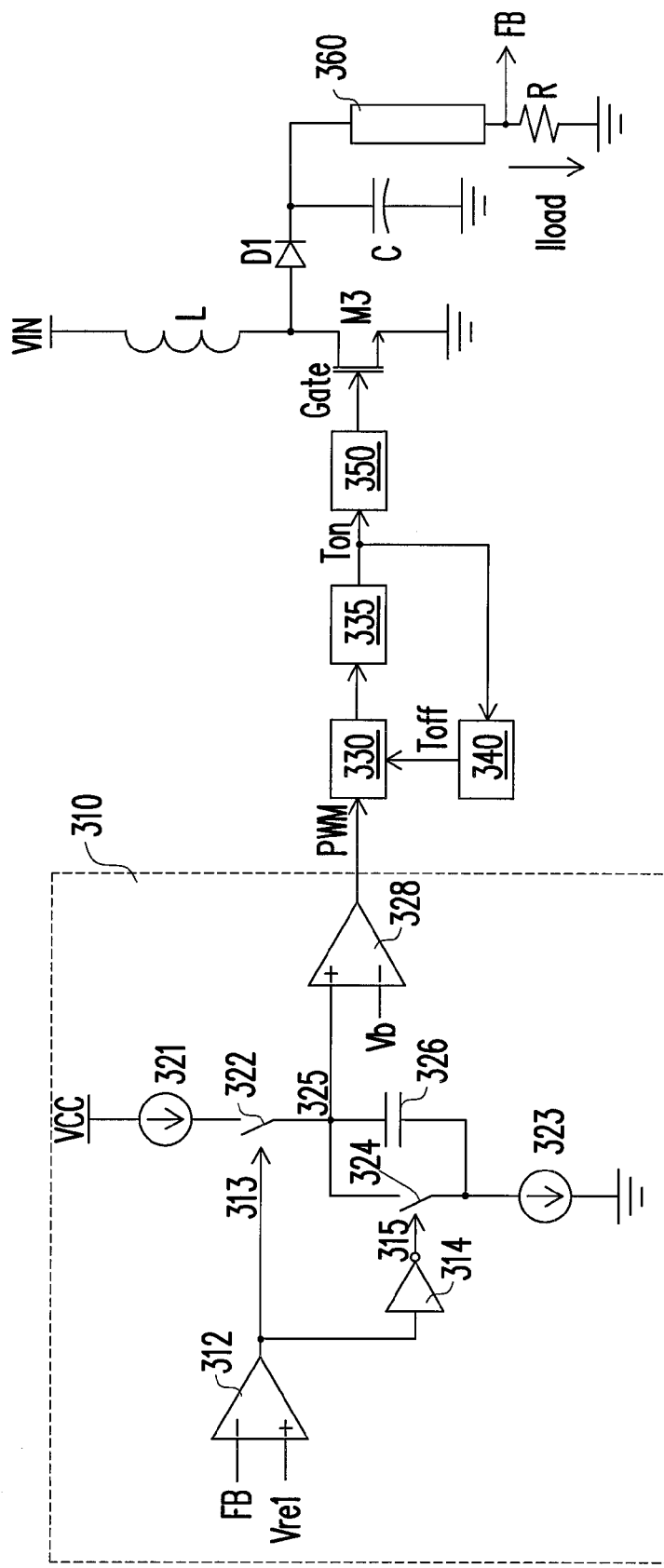
FIG. 8 is a schematic circuit diagram of a DC-to-DC buck converting circuit according to a third embodiment of the invention.

FIG. 8 is a schematic circuit diagram of a DC-to-DC buck converting circuit according to a third embodiment of the invention. Referring to FIG. 8, the DC-to-DC buck converting circuit includes a noise filtering unit 310, a rising edge triggering unit 330, an on-time unit 335, a minimum off-time unit 340, a driving unit 350, a transistor switch M3, an inductor L, an output capacitor C, and a current detecting circuit R to drive a load 360. The current detecting circuit detects a load current Iload flowing through the load 360 to generates a feedback signal FB representing the size of the load current Iload.

Figure 9:
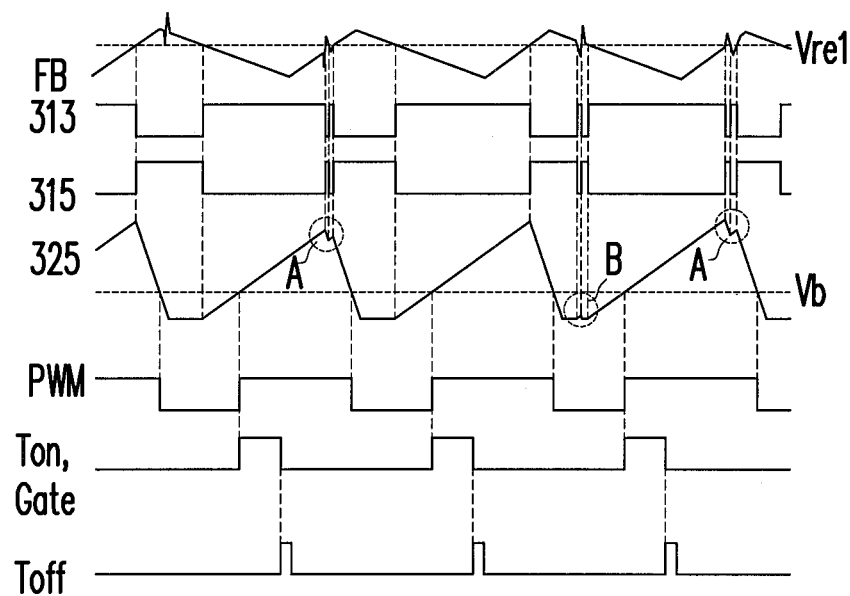
FIG. 9 is a timing diagram of signals of the DC-to-DC buck converting circuit shown in FIG. 8.

The noise filtering unit 310 includes a comparing unit 312, an inverter 314, a first current source 321, a first switch 322, a second current source 323, a second switch 324, a capacitor 326, and a comparator 328. The first switch 322 and the second switch 324 respectively control the charge and the discharge of the capacitor 326. FIG. 9 is a timing diagram of signals of the DC-to-DC buck converting circuit shown in FIG. 8. Referring to FIG. 8 and FIG. 9, the comparing unit 312 receives the feedback signal FB and a reference signal Vre1 and generates a comparing signal 313 with a high level to conduct the first switch 322 when the feedback signal FB is lower than the reference signal Vre1. The first switch 322 is coupled to the first current source 321 and the capacitor 326 and charges the capacitor 326 by the current of the first current source 321 when being conducted. At this time, the inverter 314 inverts the comparing signal 313 to output an inverting signal 315 with a low level to cut off the second switch 324. Accordingly, a voltage drop 325 of the capacitor 326 gradually increases. When the feedback signal FB is higher than the reference signal Vre1, the comparing unit 312 generates the comparing signal 313 with the low level to cut off the first switch 322 to stop charging the capacitor 326. At this time, the inverter 314 inverts the comparing signal 313 to output a signal with a high level to conduct the second switch 324. The second switch 324 is coupled to the second current source 323 and the capacitor 326 and discharges the capacitor 326 by the current of the second current source 323 when being conducted. Accordingly, the voltage drop 325 gradually decreases. In order to ensure that the voltage drop 325 returns to zero before the end of each period, setting the current of the second current source 323 to be larger than that of the first current source 321 is better. The comparator 328 compares the voltage drop 325 and a reference voltage Vb and outputs a pulse signal PWM when the voltage drop 325 is higher than the reference voltage Vb.

The rising edge triggering unit 330 generates a rising edge detecting signal to trigger the on-time unit 335 to generate a constant pulse width signal Ton when detecting the rising edge of the pulse signal PWM. The driving unit 350 generates a control signal Gate to conduct the transistor switch M3 according to the constant pulse width signal Ton. The constant pulse width signal Ton is also transmitted to the minimum off-time unit 340. The minimum off-time unit 340 generates a minimum off-time signal Toff having a constant pulse width to the rising edge triggering unit 330 when detecting the falling edge of the constant pulse width signal Ton. During the period in which the rising edge triggering unit 330 receives the minimum off-time signal Toff, the rising edge triggering unit 330 stops detecting the rising edge of the pulse signal PWM to ensure that the energy stored in the inductor L can be released.

It should be noted that, the dotted circles A and B in FIG. 9 respectively represent the conditions of which the output voltage is affected by noises during the increase and decrease processes. In this case, the voltage drop 325 stays at relatively high or relatively low levels, and thereby the interference of noises with high frequency is for a short time and does not affect the output of the comparator 328.

Figure 10:
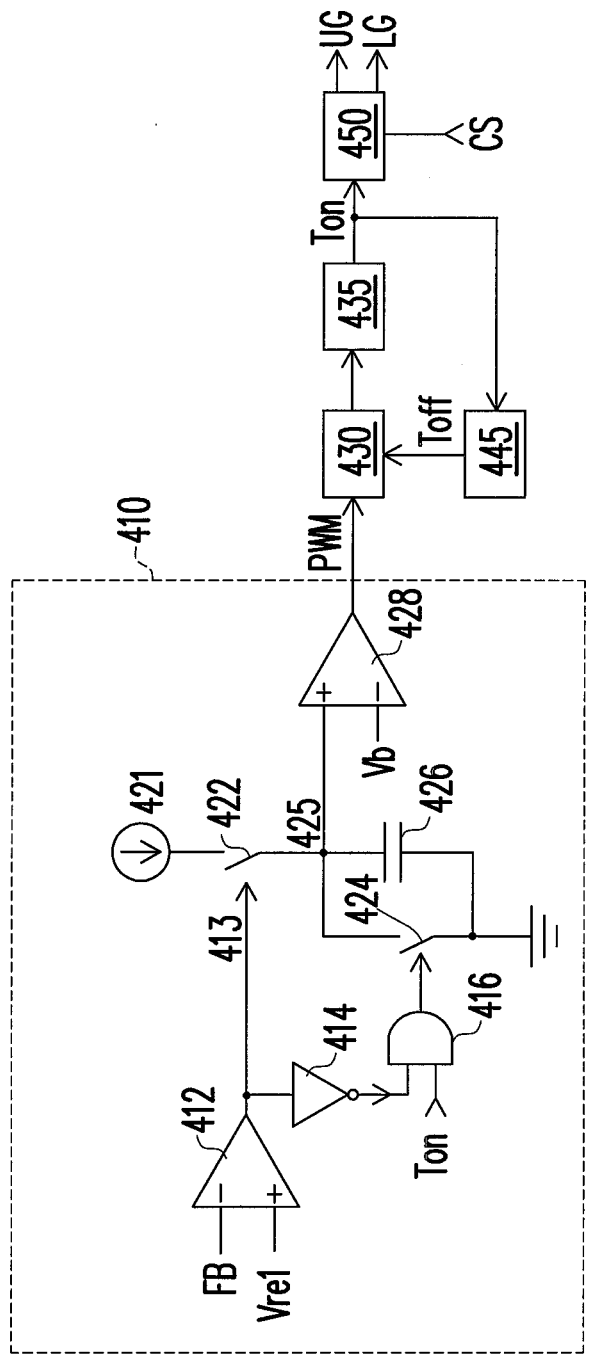
FIG. 10 is a schematic circuit diagram of a controller of a DC-to-DC buck converting circuit according to a fourth embodiment of the invention.

FIG. 10 is a schematic circuit diagram of a controller of a DC-to-DC buck converting circuit according to a fourth embodiment of the invention. Referring to FIG. 10, the DC-to-DC buck converting circuit includes a noise filtering unit 410, a rising edge triggering unit 430, an on-time unit 435, a minimum off-time unit 440, and a driving unit 450. The noise filtering unit 410 includes a comparing unit 412, an inverter 414, an AND gate 416, a current source 421, a first switch 422, a second switch 424, a capacitor 426, and a comparator 428. The first switch 422 and the second switch 424 respectively control the charge and the discharge of the capacitor 426. Compared with the controller of the DC-to-DC buck converting circuit shown in FIG. 6, the difference in the present embodiment lies in that, the discharge of the capacitor 426 is controlled according to the constant pulse width signal Ton generated by the on-time unit 435. In order to alternately conduct the first switch 422 and the second switch 424, the AND gate 416 receives the constant pulse width signal Ton and the comparing signal 413 inverted by the inverter 414 to output a signal to control the switch of the second switch 424. Accordingly, when the charge accumulated in the capacitor 426 is enough to increase the voltage drop thereof higher than the reference voltage Vb, the on-time unit 435 generates the constant pulse width signal Ton. After that, the charge accumulated in the capacitor 426 may be released. In other words, the noise filtering unit 410 determines whether an accumulating time for which the DC output voltage is lower than the predetermined output voltage is longer than the predetermined time length. If so, the noise filtering unit 410 outputs the pulse signal PWM. Herein, in the present embodiment, the initial time point (or the final time point) of each period is the time point of which the minimum off-time signal Toff is generated.

Similarly, by adding an AND gate to receive the inverting signal 315 outputted by the inverter 314 and the constant pulse width signal Ton to control the second switch 324, the DC-to-DC buck converting circuit shown FIG. 8 may determines whether to output the pulse signal PWM according to whether the accumulating time is longer than the predetermined time length.

Base on the above, in the embodiment of the invention, the circuit can filter noises with high frequency by way of time judgment, so as to avoid the erroneous operation of the controller affecting the stability of the output voltage or the output current. Compared with the method of using low-pass filters with large capacitors to filter noises, highly increasing the cost of the circuit is unnecessary in the embodiment of the invention, and the circuit in the embodiment of the invention has the capability for filtering noises with high amplitudes. In addition, by setting suitable parameters, the circuit in the embodiment of the invention can also avoid affecting the transient response of the circuit while filtering noises.

As the above description, the invention completely complies with the patentability requirements: novelty, non-obviousness, and utility. It will be apparent to those skilled in the art that various modifications and variations can be made to the structure of the invention without departing from the scope or spirit of the invention. In view of the foregoing descriptions, it is intended that the invention covers modifications, and variations of this invention if they fall within the scope of the following claims and their equivalents.

What is claimed is:

1. A controller of a de-glitch switching converting circuit, comprising:
   a noise filtering unit determining whether to output a pulse signal according to a predetermined time length and a condition of which an output voltage of the de-glitch switching converting circuit is lower than a predetermined output voltage;
   an on-time unit outputting a constant pulse width signal according to the pulse signal; and
   a driving unit controlling the de-glitch switching converting circuit according to the constant pulse width signal such that the output voltage is stabilized at the predetermined output voltage,
   wherein the noise filtering unit outputs the pulse signal when the output voltage is continuously lower than the predetermined output voltage for the predetermined time length.

2. The controller of the de-glitch switching converting circuit as claimed in claim 1, wherein the noise filtering unit comprises a comparing unit and a delay unit, the comparing unit outputs a comparing signal when the output voltage is lower than the predetermined output voltage, and the delay unit outputs the pulse signal when the comparing signal continuously exists for the predetermined time length.

3. The controller of the de-glitch switching converting circuit as claimed in claim 1, wherein the delay unit comprises:
   a capacitor;
   a first current source providing a first current to charge the capacitor;
   a first switch controlling the first current to charge the capacitor according to the comparing signal;
   a second switch discharging the capacitor according to the comparing signal or the constant pulse width signal; and
   a comparator comparing a voltage drop across the capacitor and a reference voltage and outputting the pulse signal when the voltage drop across the capacitor is higher the reference voltage.

4. The controller of the de-glitch switching converting circuit as claimed in claim 3, wherein the delay unit further comprises a second current source providing a second current to discharge the capacitor, and the second switch discharges the capacitor by the second current according to the comparing signal, wherein the second current is larger than the first current.

5. The controller of the de-glitch switching converting circuit as claimed in claim 1, wherein the noise filtering unit determines outputs the pulse signal when a accumulating time for which the output voltage is lower than the predetermined output voltage is longer than the predetermined time length during each period.

6. The controller of the de-glitch switching converting circuit as claimed in claim 5, wherein the noise filtering unit comprises a comparing unit and an accumulating delay unit, the comparing unit outputs a comparing signal when the output voltage is lower than the predetermined output voltage, and the accumulating delay unit outputs the pulse signal when the accumulating time for which the comparing signal exists is longer than the predetermined time length.

7. A de-glitch switching converting circuit, comprising:
a converting circuit transmitting an electrical power of a DC input power source to an output end according to at least one control signal, so as to provide a DC output voltage to drive a load; and
a controller determining whether to output the at least one control signal according to a predetermined time length and a condition of which the DC output voltage of the de-glitch switching converting circuit is lower than a predetermined output voltage, wherein a pulse width of the at least one control signal is constant,
wherein the controller comprises a noise filtering unit, and the noise filtering unit outputs the at least one control signal when the DC output voltage is continuously lower than the predetermined output voltage for the predetermined time length.

8. The de-glitch switching converting circuit as claimed in claim 7, wherein the controller comprises a comparing unit and a delay unit, the comparing unit outputs a comparing signal when the DC output voltage is lower than the predetermined output voltage, the delay unit outputs the at least one control signal when an accumulating time for which the comparing signal exists is longer than the predetermined time length during each period.

9. The de-glitch switching converting circuit as claimed in claim 7, wherein the converting circuit is a DC-to-DC buck converting circuit or a DC-to-DC boost converting circuit.

10. A controller of a de-glitch switching converting circuit, comprising:
a noise filtering unit determining whether to output a pulse signal according to a predetermined time length and a condition of which a load current flowing through a load provided by the de-glitch switching converting circuit is lower than a predetermined output current;
an on-time unit outputting a constant pulse width signal according to the pulse signal; and
a driving unit controlling the de-glitch switching converting circuit according to the constant pulse width signal such that the load current is stabilized at the predetermined output current,
wherein the noise filtering unit outputs the pulse signal when the load current is continuously lower than the predetermined output current for the predetermined time length.

11. The controller of the de-glitch switching converting circuit as claimed in claim 10, wherein the noise filtering unit comprises a comparing unit and a delay unit, the comparing unit outputs a comparing signal when the load current is lower than the predetermined output current, and the delay unit outputs the pulse signal when the comparing signal continuously exists for the predetermined time length.

12. The controller of the de-glitch switching converting circuit as claimed in claim 11, wherein the delay unit comprises:
a capacitor;
a first current source providing a first current to charge the capacitor;
a first switch controlling the first current to charge the capacitor according to the comparing signal;
a second switch discharging the capacitor according to the comparing signal or the constant pulse width signal; and
a comparator comparing a voltage drop across the capacitor and a reference voltage and outputting the pulse signal when the voltage drop across the capacitor is higher the reference voltage.

13. The controller of the de-glitch switching converting circuit as claimed in claim 12, wherein the delay unit further comprises a second current source providing a second current to discharge the capacitor, and the second switch discharges the capacitor by the second current according to the comparing signal, wherein the second current is larger than the first current.

14. A de-glitch switching converting circuit, comprising:
a converting circuit transmitting an electrical power of a DC input power source to an output end to provide a DC output voltage to drive a load; and
a controller determining whether to output a pulse signal according to a predetermined time length and a condition of which a load current flowing through a load provided by the de-glitch switching converting circuit is lower than a predetermined output current, wherein a pulse width of the at least one control signal is constant,
wherein the controller comprises a noise filtering unit, and the noise filtering unit outputs the at least one control signal when the load current is continuously lower than the predetermined output current for the predetermined time length.

15. The de-glitch switching converting circuit as claimed in claim 14, wherein the controller comprises a comparing unit and a delay unit, the comparing unit outputs a comparing signal when the load current is lower than the predetermined output current, and the delay unit outputs the at least one control signal when an accumulating time for which the comparing signal exists is longer than the predetermined time length during each period.

16. The de-glitch switching converting circuit as claimed in claim 14, wherein the converting circuit is a DC-to-DC buck converting circuit or a DC-to-DC boost converting circuit.

* * * * *